United States Patent [19]

Tanaka

[11] Patent Number: 4,802,769
[45] Date of Patent: Feb. 7, 1989

[54] APPARATUS FOR TREATING THERMOPLASTIC RESIN

[75] Inventor: Shoichi Tanaka, Numazu, Japan

[73] Assignee: Veb Kombinat Polygraph "Werner Lamberz" Leipzig, Leipzig, Fed. Rep. of Germany

[21] Appl. No.: 947,042

[22] Filed: Dec. 29, 1986

[30] Foreign Application Priority Data

Jan. 7, 1986 [JP] Japan .................................. 61-1149

[51] Int. Cl.$^4$ .............................................. B29B 1/10
[52] U.S. Cl. ...................................... 366/75; 366/76; 425/84; 425/200; 425/209
[58] Field of Search ............... 366/75, 76, 77, 79, 366/83, 84, 85, 318, 297, 301, 144, 146; 425/207, 208, 209, 200

[56] References Cited

U.S. PATENT DOCUMENTS

| | | | |
|---|---|---|---|
| 3,578,740 | 5/1971 | Redding | 425/84 |
| 3,963,558 | 6/1976 | Skidmore | 366/83 |
| 4,107,787 | 8/1978 | Ocker | 366/75 |
| 4,260,264 | 4/1981 | Maki | 366/75 |
| 4,446,094 | 6/1984 | Rossiter | 366/75 |

Primary Examiner—Robert W. Jenkins
Attorney, Agent, or Firm—Michael J. Striker

[57] ABSTRACT

Apparatus for treating a thermoplastic resin is made up of a feed barrel supplied with the thermoplastic resin, a slit barrel for discharging a liquid component of the resin, a press-in barrel into which a polymer is admitted under pressure, and a vent barrel having a vent opening for discharging vaporized substance generated by the thermoplastic resin and the polymer. These barrels are serially interconnected to from a cylinder which contains a screw for kneading a mixture of the resin and the polymer. The kneaded mixture is extruded as a strand.

4 Claims, 3 Drawing Sheets

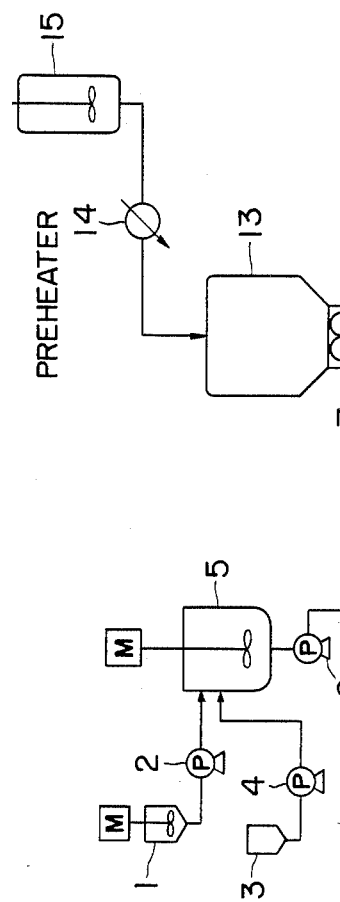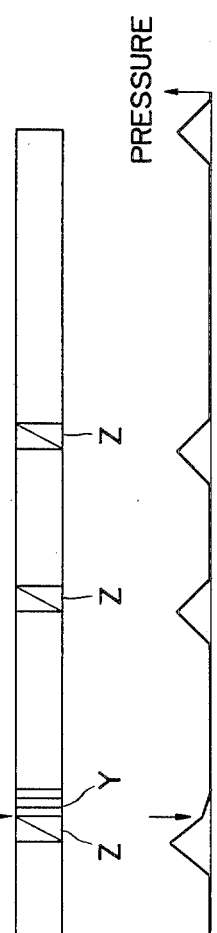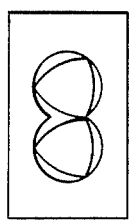

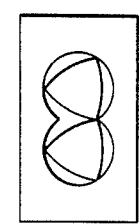
FIG.2C
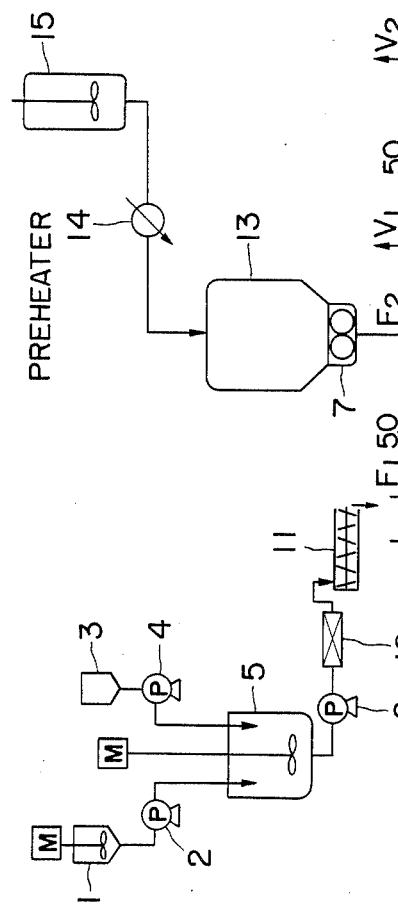
FIG.2A
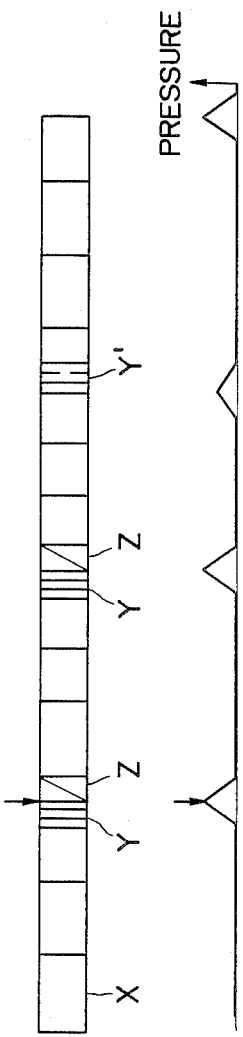
FIG.2B
FIG.2E

APPARATUS FOR TREATING THERMOPLASTIC RESIN

BACKGROUND OF THE INVENTION

This invention relates to apparatus for continuously treating thermoplastic resin, more particularly acrylonitrile-butadiene-styrene (ABS) type resin consisting of a vinyl type molten polymer obtained by continuous lump polymerization or solution polymerization, a graft polymerized latex obtained by emulsion graft polymerizing a diene type rubbery polymer and a monomeric vinyl, or a mixed latex of the graft polymerized latex and rubbery polymerized latex for effecting precipitation and coagulation with lesser energy than prior art apparatus.

Among prior art methods of preparing ABS type resin are included:

1. a method of preparing the ABS type resin from a graft polymer obtained by emulsion polymerization or a vinyl type polymer obtained by suspension or lump polymerization;
2. a method of preparing the ABS type resin from a graft polymer obtained by emulsion polymerization and a vinyl type polymer obtained by emulsion polymerization;
3. a method of manufacturing the ABS type resin from a graft polymer obtained by emulsion polymerization and a vinyl type polymer obtained by emulsion or lump polymerization;
4. a method of preparing the ABS type resin in which a mixture of a graft polymer and a vinyl type polymer is synthesized in one step, that is one step emulsion polymerization, one step suspension polymerization, one step emulsion-suspension polymerization, or one step emulsion-lump polymerization; and
5. a method of preparing the ABS type resin from a graft polymer synthesized by the emulsion-suspension polymerization or the emulsion-lump polymerization, and the vinyl type polymer obtained by the method 1 or 2 described above.

However, the method 4 utilizing the single step polymerization is not suitable for a variety of products, while the method 3 is inferior to the methods 1 and 2 in the shock resistant property, especially in the low temperature shock resistant property. For this reason, the method 1 or 2, especially method 1 is used industrially.

Generally, the ABS type resin is prepared from graft polymerized latex obtained by subjecting to emulsion graft polymerization a diene type rubbery polymer and a vinyl monomer, and from a slurry of a suspension or lump polymerized vinyl type polymer, pellets of a vinyl type polymer, and a slurry of a suspension or lump shaped vinyl type polymer or pellets of a vinyl type polymer. More particularly the ABS type resin is manufactured by mixing, extruding and deairating a graft polymer isolated by precipitating, coagulating, dehydrating and drying a graft polymerized latex, vinyl type polymer beads obtained by dehydrating and drying a slurry of a vinyl type polymer obtained by suspension polymerization or pellets of a vinyl type polymer obtained by lump polymerization. Accordingly, the process of preparing the ABS type resin is extremely complicated and requires a variety of steps so that there are many disadvantages that drying cost as well as running cost are expensive, that the loss of the polymer during manufacturing is large and that a large labour is necessary. For these reasons, there have been proposed recovering techniques of latex from the methods 2 and 5 described above. However, the method 5 is not used commonly because of its technical difficulty. In method 2, the technique of recovering latex during the process of manufacturing the ABS type resin is only one type of recovering, so that there has been a request for developing technique that can be applied to many fields and is valuable for industrial use.

SUMMARY OF THE INVENTION

Accordingly, it is an object of this invention to provide novel apparatus for continuously treating the ABS type resin with lesser energy than the prior art apparatus.

Another object of this invention is to provide a process of preparing a novel acrylonitrile-butadiene-styrene (ABS) type resin from a graft polymer and a vinyl type polymer capable of simplifying the steps of preparing the ABS type resin.

According to one aspect of this invention there is provided apparatus for treating a thermoplastic resin comprising a feed barrel supplied with the thermoplastic resin; a slit barrel provided with a plurality of slits through the peripheral wall of the slit barrel, the slits discharging a liquid component of the resin to the outside of the slit barrel; a press-in barrel into which a polymer is admitted under pressure; a vent barrel having a vent opening for discharging vaporized substance generated by the thermoplastic resin and the polymer; means for serially interconnecting the barrels into a cylinder; and a screw contained in the cylinder for kneading and transferring a mixture of the resin and the polymer.

According to another aspect of this invention, there is provided a process for preparing an acrylonitrile-butadiene-styrene (ABS) type resin from a graft polymer and a vinyl type polymer comprising the steps of (1) forming a slurry or water containing polymer from a vinyl type polymer latex; (2) forming a slurry or water containing polymer from a graft polymer latex obtained by subjecting a diene type rubbery polymer and a vinyl type monomer to emulsion graft polymerization to obtain a latex which contains less than 80% of the diene type rubbery polymer based on the total solid component in the latex; (3) forming a slurry or a water containing slurry of a mixture of a latex of a diene type or a vinyl type rubbery polymer and a latex of a graph polymer formed by subjecting a diene type rubbery polymer and a vinyl type monomer to emulsion graft polymerization, the latex containing less than 80% of the diene type rubbery polymer latex based on the total solid component in the latex; (4) forming a slurry or water containing polymer from a mixture of the polymers obtained by the steps (1) and (2) or the steps (1) and (3); (5) forming a molten vinyl type polymer by continuous lump polymerization or solution polymerization; and (6) admixing and kneading the graft polymer slurry and an acrylonitrile-styrene-copolymer.

BRIEF DESCRIPTION OF THE DRAWINGS

In the accompanying drawings:

FIG. 1A is a diagrammatic representation showing one embodiment of the apparatus for continuously treating thermoplastic resin according to this invention;

FIG. 1B is a side view of a screw used in the apparatus shown in FIG. 1A;

FIG. 1C is a diagrammatic sectional view of the screw shown in FIG. 1B;

FIG. 1E shows a pressure distribution in the cylinder shown in FIG. 1A;

FIGS. 2A, 2B, 2C, 2E and FIGS. 3A, 3B, 3E are diagrammatic representations showing other embodiments of this invention respectively corresponding to FIGS. 1A, 1B, 1C and 1E.

DESCRIPTION OF THE PREFERRED EMBODIMENTS

Figure 3A:
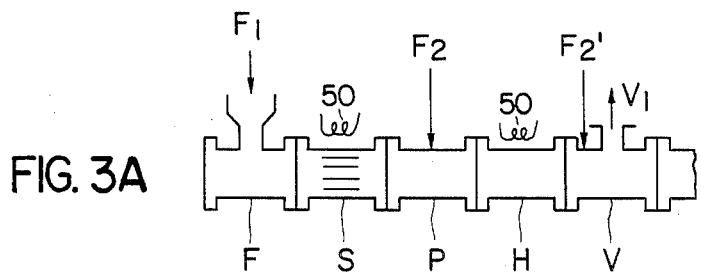
Figure 3B:
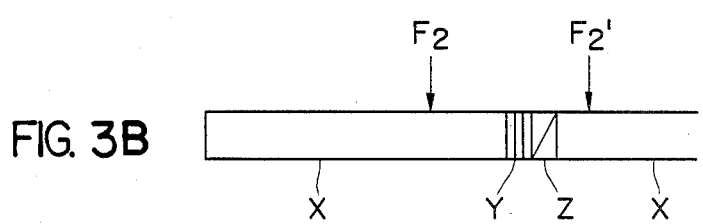
Figure 3E:
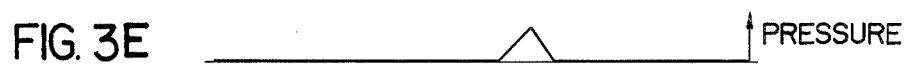

Referring now to FIGS. 1A, 1B and 1C, the apparatus of this invention for treating a thermoplastic resin, more particularly, ABS type resin will firstly be described. In FIG. 1A, reference numeral 1 designates a graft polymer latex tank, 3 a salting out agent tank, 7 a gear pump for metering and admitting under pressure a molten AS polymer, and 2, 4 and 6 designate pumps respectively. The graft polymer latex sent from the graft polymer latex tank 1 is mixed by agitation with a salting out agent sent from the salting out agent tank 3 in a mixing tank 5 so as to rupture emulsion thereby converting into a graft polymer slurry. On the other hand, after being subjected to lump (solution) polymerization, the AS polymer is supplied to a flushing chamber 13 (which evaporates any vaporizing component) from a tank 15 through a preheater 14. After removing most of the not yet reacted monomer and a solvent used at the time of polymerization, the AS polymer in the tank 13 is admitted through a gear pump 7 acting as a metering pump to a barrel P disposed between barrels S and V of the treating apparatus of this invention. The graft slurry in the tank 5 is supplied at a definite quantity to the treating apparatus of this invention through a port $F_1$.

FIG. 1A diagrammatically shows the treating apparatus of this invention, FIG. 1B shows the construction of the cylinder and screw used in the apparatus, FIG. 1C is a diagrammatic sectional view of the screw, and FIG. 1E shows the pressure distribution in the cylinder. In FIG. 1A, F, H, S, P, V and D respectively show a feed barrel, a standard barrel, a slit barrel, a press-in barrel, a vent barrel and a die or an extruder. In FIG. 1B, X, Y, Y' (see FIG. 2B) and Z respectively represent a forward screw, a kneading disc, a group of kneading discs arranged in the form of a reverse screw, and a reverse screw. Consequently, the graft polymer slurry sent to the treating apparatus through pump 6 is sent forwardly through feed barrel F and forward screw X. The slurry mixture sent to the slit barrel S is subjected to a back pressure created by the kneading disc Y and the reverse screw Z on the downstream side so that the separated water content is discharged to the outside of the treating apparatus through a plurality of slits provided through the peripheral wall of the slit barrel S. To the standard barrel P containing the ABS resin whose pressure has been increased by the kneading disc Y and the reverse screw Z, is admitted, at a definite quantity, molten AS polymer through gear pump 7 for combining the AS polymer with the graft polymer. Then the mixture is admixed and kneaded by the screw or kneading disc. The graft polymer is rapidly heated and softened by the heat generated by the kneading action and the heat of the molten ABS polymer itself. As a consequence, the separation of the water contained in the graft polymer is accelerated so that the quantity of water discharged through the slits increases. As shown in FIGS. 1A and 2A, it is necessary to admit under pressure the AS polymer to a position at which the back pressure caused by the screw or the kneading disc, etc. is applied. More particularly, it is advantageous to admit under pressure the molten AS polymer at or near the peak of the slope of the pressure distribution curve at which the pressure increases as shown in FIGS. 2E. This is necessary for discharging the water through the slits without being trapped. Although where the slurry polymer is admitted at a position shown in FIG. 1A, the dehydration efficiency through the slits is not improved greatly, since the molten ABS polymer prepared by the lump (solution) polymerization is admitted without being cooled, a higher energy efficiency can be obtained than the prior art apparatus in which the ABS pellets are supplied to port $F_1$ shown in FIG. 1A.

The resin admitting position should be in a section or barrel in which the internal pressure is generated or a position near the section. Even when the position is situated at a position intermediate of barrels S and V, when the resin is admitted at a position remote from the section as shown in FIG. 3A, for example at a position $F_2$, the admitted molten polymer tends to partially close the screw passage so that the water separated by the reverse screw Z and the kneading disc Y which are located on the downstream side is temporarily trapped thereby generating a surge phenomenon. Even when the molten polymer does not close the screw passage the high temperature material introduced into this portion comes to contact with the water separated at portions Y and Z thereby generating steam which is discharged through the slits. Since the temperature of the AS resin is decreased by the latent heat of evaporation, the motive power for operating the treating apparatus of this invention increases. When the resin is admitted at position $F_2'$ shown in FIG. 3A, admixture of the graft polymer and the AS polymer becomes insufficient or not mixed together. Thus, the polymers under these states would pass through the vent section. The graft polymer sent to the vent section from the reverse screw Z is released from pressure and since the remaining water evaporates, vigorous foaming would result and at the same time the temperature would decrease. As a consequence, small crumbs are formed which are discharged to the outside together with the steam generated. Vent stuffers or the like are used for preventing this. Even with such measure, when the size of the dispersing crumbs is small and as the quantity of steam becomes large it becomes impossible to prevent discharge of the steam and the crumbs. Our experience shows that the dispersion of the crumbs can be decreased by cokneading the AS polymer with the ABS polymer.

The dehydrated polymer is heat melted and remaining water, remaining monomer etc. are vaporized and discharged to the outside of the apparatus.

The heat melted polymer is successively extruded through the die D to be taken out in the form of a strand. When the strand is cooled in a cooling tank and cut by a cutter a pellet shaped ABS resin can be obtained.

With the screw type thermoplastic resin treating apparatus of this invention, a graft polymer prepared by emulsion polymerization and a molten vinyl type polymer obtained by continuous lump polymerization or solution polymerization are simultaneously supplied to respective supply ports and the ABS type resin can be obtained by mixing, dehydrating, drying, melting and plasticizing the polymer with a single apparatus. Consequently, it is possible to prepare the ABS type resin using various raw materials of different types.

A modification shown in FIGS. 2A and 2B is similar to the embodiment shown in FIGS. 1A and 1B except that a slurry of a graft polymer contained in the tank 5 is dehydrated by a dehydrating machine or a combination 10 of a dehydrating machine and a washing machine. A resulting water containing powder is supplied to supply port or point $F_1$ with a double screw feeder 11.

This embodiment too can prepare the ABS type resin with lesser power than the prior art apparatus since the molten AS polymer is added to port $F_2$.

When an emulsifying agent, an emulsification stabilizer and a salting out agent are contained in the treated polymer, the characteristics thereof degrade. More particularly, the mechanical strength and appearance of the products made of the treated polymer are affected. According to the treating apparatus of this invention these water soluble impurities are discharged to the outside of the apparatus together with water.

Various types of screws and kneading discs diagrammatically shown in the drawing are described in detail in various prior art references such as "Werner & Pfleideres ZSK 160 Twin-Screw Compounding Extruder", International Plastics Engineering, Jan. 1695, pages 12-15, and I. Tanimoto's paper of the title "Two Axes Extruder Rotating in Different Directions, Synthetic Resins", Vol. 20, No. 8, 1974, Aug.

Having completed the description of the treating apparatus, the detail of the ABS type resin will now be described.

As the polymer latex utilized to prepare the ABS type resin of this invention, the followings can be used.

I. A latex of such homopolymer or compolymer as an aromatic (for example styrene and α-methylstyrene) vinyl monomer, such cyanated vinyl monomer as nitrile methacrylate and such acryl methacrylate as methylmethacrylate, ethylmethacrylate, etc. Examples of such copolymers are styrene-acrylonitrile copolymer, α-methylstyrene-acrylonitrile copolymer, styrene-α-methyl styrene-acrylonitrile copolymer, styrene-methylmethacrylate-acrylonitrile, styrene-α-methylstyrene-acrylonitrile-methyl methacrylate copolymer, etc.

II. A latex of such graft polymer prepared by emulsion graft polymerizing polybutadiene, butadiene-styrene copolymer, butadiene-acrylonitrile copolymer, such diene type rubbery polymer as polybutadiene, butadiene-styrene copolymer, butadiene-acrylonitrile copolymer, isoprene rubber and chloroprene rubber with a vinyl type monomer described in I.

III. A latex of mixed polymers prepared by admixing a graft polymer shown in II and a diene type rubbery polymer shown in II and/or ethylene-vinyl acetate, ethylene-vinyl acetate, ethylene-vinyl acetate-acrylic acid ester.

IV. A latex of a mixed polymer obtained by admixing polymers of I and II or I and III.

Regarding II, III and IV, it is essential to select the ratio of the diene type polymer to be less than 80% based on the total solid component in the latex. More particularly, if the percentage of the diene type rubbery polymer exceeds 80%, the percentage of grafting decreases which decreases compatibility in a resin phase, thus greatly decreasing the shock proof property of the ABS resin.

In the latex of the polymer treated by the apparatus of this invention, although there is no limit on the emulsifying agent utilized at the time of emulsion polymerization, polymerization starting agent, chain shifting agent and other medicals can be used. Thus, any agent utilized in ordinary emulsion polymerization may be used.

As the molten vinyl type polymers may be mentioned the vinyl type polymers of II prepared by continuous lump polymerization or solution polymerization.

After removing not yet polymerized monomer and solvent by passing the polymer described above through a flushing chamber, the polymer may be admitted, under pressure, into the treating apparatus of this invention with such means as a gear pump, or the polymer containing not yet reacted monomer and the solvent may be admitted, under pressure, into the treating apparatus. However, since the principal object of this invention is to obtain a resin treating apparatus of high energy efficiency, admission of a polymer containing a large quantity of monomer and solvent into the treating apparatus of this invention is not advantageous because volatile components in polymers selected from I through III may be incorporated into the monomer recovered by the vent section of the treating apparatus. However, by limiting the quantities of the not yet polymerized monomer and the solvent remaining in the polymer to be introduced into the treating apparatus of this invention to a value less than or a little more than a permissible value for the final products, not only the volatile component separating apparatus as the flushing chamber can be miniaturized but also the load of an evacuation device can be decreased thereby increasing the overall efficiency of the treating apparatus. Since this apparatus includes multi-stage vent sections for evaporating and separating the water component contained in the polymers of I through IV, removal of the volatile components and remaining monomers can be efficiently done by vaporizing them together with the remaining water component.

It is especially important to admit, under pressure, a molten polymer prepared by the method described above into the treating apparatus as it is without cooling and pelletizing the molten polymer as in the prior art practice. The proportion of admixing a polymer of II-IV and the molten polymer described above should be such that the percentage of the diene type rubbery polymer is less than 80% of the mixture but from the standpoint of the physical characteristics of the ABS type resin, percentage of 3~30% is preferred.

Although the treating apparatus of this invention is one type of a screw extruder consisting essentially of a cylinder, a screw and a screw drive unit, the invention is characterized in that the cylinder and the screw are divided into a plurality of blocks. More particularly, the cylinder is divided into a feed barrel F supplied with a slurry, beads, crumbs, slit barrel S provided with slits which permit passage of liquid but do not pass solids or a barrel provided with a mechanical filter, a standard barrel with heating means 50, a press-in barrel P into which a molten vinyl type polymer is admitted under pressure, vent barrels V each having a vent opening for removing volatile substances, press-in barrels P in which a lubricant, a pigment and a stabilizer are incorporated into the polymer and a die D for extruding a molten polymer composition. The positions and lengths of these barrels can be changed as desired depending upon the field of use. Among screws are included a forward screw feeding solid composition in the forward direction, a reverse screw feeding the solid composition in the opposite direction and a kneading screw which kneads the solid composition. Usually each screw comprises two shaft split screws and their positions and lengths can be changed as desired like the barrels. Consequently, by properly changing the constructions and lengths of the barrels and screws depending upon the shape and state of the polymer composition admitted into the treating apparatus of this invention it becomes possible to extrude the polymer composition in a proper molten state. The heating means 50 can be provided not only for the standard barrel but also for other barrels such as barrel H as shown in FIGS. 1A, 2A and 3A. For simplicity, the heating means 50 are diagrammatically shown as electric heaters, but as is well known in the art, other heating means such as hot air, hot liquid or steam heating means can also be used.

If desired, depending upon the states of the compounds being fed, by using a screw type extruder or a constant quantity feeder, a lubricant, a pigment, a stabilizer or a powder, beads or pellets can be added to an intermediate point of the cylinder made up of a plurality of barrels. Furthermore, a vent stuffer can be used which returns to the cylinder a popcorn shaped polymer often effluing through the opening of the press-in barrel or the vent opening of the vent barrel.

Examples of test results of the treating apparatus of this invention are as follows.

Example 1

A two shaft screw extruder, type TEM 50B (manufactured by the assignee and having a construction shown in FIG. 2A) was used for treating an ABS type resin.

Materials supplied to ports $F_1$ and $F_2$ were as follows.

$F_1$: A powder of graft polymer (containing 65% by weight of diene type rubber) having a water content of 39% by weight.

$F_2$: Molten AS polymer (degree of polymerization of 99.5%) at a temperature of 220° C.

Temperatures of the barrels shown in FIG. 2A (since there are a number of barrels V and H in FIG. 2A, these barrels are designated by B3-B9) were: B3 - 180° C., B4 - 150° C., B5 - 230° C., B6 - 230° C., B7 - 230° C., B8 - 230° C., B9 and B10 - 230° C., D - 250° C.

| | |
|---|---|
| The quantity of the water containing graft polymer supplied to port $F_1$ | 81 Kg/Hr |
| The quantity of the molten AS polymer supplied to port $F_2$ | 177 Kg/Hr |
| The quantity of polymer extruded Q (the quantity of rubber contained 14.2%) | 226 Kg/Hr |
| The number of revolutions of the screw | 200 rpm |
| The screw driving power Z | 20.5 KW |
| The temperature of the extruded composition | 256° C. |
| Specific energy (Z/Q) | 0.91 KWH/Kg |

Pale white water was discharged from the slit section or barrel and a stable flow was observed. The extruded pellets do not contain macaroni shaped pellets and their colour phase was excellent. The extruder was operated stably without any variation in the quantity of the extruded strand.

Example 2

The same material and apparatus as in Example 1 were used except that the construction of the screw in a barrel having pouring port $F_2$ was changed to that shown in FIG. 1C.

| | |
|---|---|
| Quantity of the water containing graft polymer supplied to port $F_1$ | 81 Kg/Hr |
| Quantity of molten AS polymer supplied to port $F_2$ | 189 Kg/Hr |
| Quantity of the polymer extruded Q (quantity of rubber contained 13.5%) | 1,238 Kg/Hr |
| Number of revolutions of the screw | 1,301 rpm |
| Temperature of the extruded product | 268° C. |
| Screw driving power Z | 35.9 KW |
| Specific energy Esp (Z/Q) | 0.15 KWH/Kg |

No water flowed out from slit section. The product did not contain any macaroni shaped pellets. Pellets of good color phase were obtained.

Control Example 1

The same material and apparatus as those of Examples 1 and 2 were used except that the molten AS polymer was supplied to Port $F_2$ shown in FIG. 3A.

| | |
|---|---|
| Quantity of water containing graft polymer supplied to port $F_1$ | 68 Kg/Hr |
| Quantity of molten AS polymer supplied to port $F_2$ | 122 Kg/Hr |
| Quantity of the polymer extruded (quantity of rubber contained 16.5%) | 163 Kg/Hr |
| Number of revolutions of screw | 150 rpm |
| Screw driving power (average) | 19.5 KW |
| Extrusion temperature | 257° C. |
| Specific energy (Z/Q) | 0.12 KWH/Kg |

Steam was vigorously blown out from the slit section acompanying a substantial quantity of fine particles of the graft polymer. Further, variation in the AS polymer press-in pressure was large.

Control Example 2

Apparatus shown in FIG. 2A and 2B was used except that instead of supplying the molten AS to port $F_2$, a mixture of AS pellets and water containing graft polymer was supplied to port $F_1$ and that as an extruder was used TEM 120B type extruder manufactured by the assignee.

| | |
|---|---|
| Quantity of water containing graft polymer supplied to port $F_1$ (water content: 35%) | 595 Kg/Hr |
| Quantity of AS polymer pellets supplied to port $F_1$ | 1,420 Kg/Hr |
| Quantity of polymer extruded (rubber content 14%) | 1,800 Kg/Hr |
| Number of revolutions of screw | 290 rpm |
| Screw driving power | 385 KW |
| Extrusion temperature | 270° C. |
| Specific energy | 0.21 KWH/Kg |

Water stably flowed out from slits, and pellets of good colour phase were stably obtained.

Products treated and extruded by the apparatus have excellent tension strength, durability, corrosion resistant property and a certain degree of elasticity so that they are suitable for manufacturing tableware and balling game balls.

What is claimed is:

1. Apparatus for treating a thermoplastic resin comprising:
   means for preparing a diene type graft polymer slurry;
   means for evaporating off vaporizing component from an acrylonitrile-styrene copolymer;

a cylinder constituted by a feed barrel, a standard barrel having longitudinal slits for removing vaporized component, a press-in barrel and a plurality of vent barrels, each provided with a vent opening, and a plurality of heating cylinders respectively interposed between said vent barrels;

said barrels being connected together in the order mentioned to form said cylinder;

means for feeding said graft polymer slurry into said feed barrel;

means for feeding under pressure said AS polymer into said press-in barrel;

a double screw contained in said cylinder for kneading and transferring a mixture of said graft polymers slurry and said AS polymer; and an extruder connected to an end of said cylinder opposite to said feed barrel for extruding a kneaded mixture;

said screw being provided with forward screw in said feed barrel in reverse screws respectively installed in said press-in barrel and said heating barrels for applying back pressures to flows of said graft polymer slurry and said mixture, and a kneading screw installed in said feed-in barrel downstream of said reverse screw in said feed-in barrel.

2. The apparatus according to claim 1 further comprising means for supplying a slurry of a graft polymer to said feed barrel, said slurry being obtained by admixing a graft polymer latex and a salting out agent in a tank.

3. The apparatus according to claim 2 wherein said slurry is obtained from a mixed latex consisting of a slurry or a water containing polymer obtained from a vinyl type polymer latex, a slurry or a water containing polymer prepared from a graft polymer latex obtained by subjecting a diene type rubbery polymer and a vinyl type monomer to emulsion graft polymerization;

said graft polymer latex containing less than 80% by weight of said diene type rubbery polymer based on entire solid components in said latex; and a slurry consisting of a mixture of a latex of a diene type or a vinyl type rubbery polymer, and a graft polymer latex obtained by subjecting a diene type rubbery polymer and a vinyl type monomer to emulsion graft polymerization, said mixture containing less than 80% by weight of diene type rubbery polymer based on a total solid component of said latex.

4. The apparatus according to claim 1 further comprising a flushing chamber for removing substantial portions of not yet polymerized monomer and a solvent from a solution polymerized acryl-butadiene copolymer, and pump means for supplying under pressure said solution polymerized acryl-butadiene copolymer into said pressure barrel.

* * * * *

UNITED STATES PATENT AND TRADEMARK OFFICE
CERTIFICATE OF CORRECTION

PATENT NO. : 4,802,769
DATED : Feb 7, 1989
INVENTOR(S) : Shoichi Tanaka

It is certified that error appears in the above-identified patent and that said Letters Patent is hereby corrected as shown below:

ON THE TITLE PAGE:
    In [73] Assignee: Change "Veb Kombinat Polygraph "Werner Lamberz" Leipzig, Leipzig, Fed. Rep. of Germany" to --TOSHIBA KIKAI KABUSHIKI KAISHA, Tokyo, Japan--

Signed and Sealed this

Nineteenth Day of December, 1989

*Attest:*

JEFFREY M. SAMUELS

*Attesting Officer*     *Acting Commissioner of Patents and Trademarks*